(12) United States Patent
Garner et al.

(10) Patent No.: US 12,163,311 B2
(45) Date of Patent: Dec. 10, 2024

(54) SUBSEA PLOUGH FOR BURYING A FLEXIBLE ELONGATE MEMBER

(71) Applicant: OSBIT LTD, Riding Mill (GB)

(72) Inventors: Robert Garner, Riding Mill (GB);
Matthew Heap, Riding Mill (GB);
Robert Blakeman, Riding Mill (GB)

(73) Assignee: OSBIT LTD, Riding Mill (GB)

(*) Notice: Subject to any disclaimer, the term of this patent is extended or adjusted under 35 U.S.C. 154(b) by 532 days.

(21) Appl. No.: 17/418,392

(22) PCT Filed: Dec. 17, 2019

(86) PCT No.: PCT/GB2019/053572
§ 371 (c)(1),
(2) Date: Jun. 25, 2021

(87) PCT Pub. No.: WO2020/148514
PCT Pub. Date: Jul. 23, 2020

(65) Prior Publication Data
US 2022/0074166 A1  Mar. 10, 2022

(30) Foreign Application Priority Data
Jan. 16, 2019 (GB) .................................. 1900580

(51) Int. Cl.
*E02F 5/02* (2006.01)
*E02F 5/12* (2006.01)
(Continued)

(52) U.S. Cl.
CPC .............. *E02F 5/027* (2013.01); *E02F 5/125* (2013.01); *E02F 5/145* (2013.01); *H02G 1/10* (2013.01)

(58) Field of Classification Search
CPC ........... E02F 5/027; E02F 5/125; E02F 5/145; H02G 1/10
See application file for complete search history.

(56) References Cited

U.S. PATENT DOCUMENTS

| 4,759,138 A | 7/1988 | Grinsted |
| 4,892,443 A | 1/1990 | Kunze et al. |

(Continued)

FOREIGN PATENT DOCUMENTS

| EP | 0 010 915 | 5/1980 |
| EP | 2840187 | 2/2015 |

(Continued)

OTHER PUBLICATIONS

International Search Report and Written Opinion dated Mar. 4, 2020 issued in PCT International Patent Application No. PCT/GB2019/053572, 13 pp.

(Continued)

*Primary Examiner* — Tara Mayo
(74) *Attorney, Agent, or Firm* — NIXON & VANDERHYE P.C.

(57) ABSTRACT

A subsea plough includes a plough share coupled to a chassis, boulder clearance and spoil clearance members, and front and rear support surfaces. In a first configuration, a maximum span of the boulder clearance member in an extended position is greater than a span of the spoil clearance member. The plough may be reconfigurable to include a backfill member. A method of use of the plough is provided in a boulder clearing only mode, and optional modes of simultaneous boulder clearing and trenching, second pass trenching, and backfilling a trench to bury a flexible elongate member in a seabed.

20 Claims, 14 Drawing Sheets

(51) Int. Cl.
*E02F 5/14* (2006.01)
*H02G 1/10* (2006.01)

(56) References Cited

U.S. PATENT DOCUMENTS

| | | | | |
|---|---|---|---|---|
| 6,837,653 | B1 * | 1/2005 | Grinsted | ............... E02F 5/145 405/164 |
| 2014/0150303 | A1 | 6/2014 | Wilson | |

FOREIGN PATENT DOCUMENTS

| | | |
|---|---|---|
| EP | 3216925 | 9/2017 |
| GB | 2353306 | 2/2001 |
| GB | 2364358 | 1/2002 |
| GB | 2545925 | 7/2017 |
| WO | WO 99/13171 | 3/1999 |
| WO | WO 01/21900 | 3/2001 |

OTHER PUBLICATIONS

Great Britain Search Report dated Jun. 7, 2019 issued in Great Britain Patent Application No. 1900580.0, 3 pp.
European Examination Report dated Sep. 16, 2022 issued in European Patent Application No. 19831798.4, 5 pp.

* cited by examiner

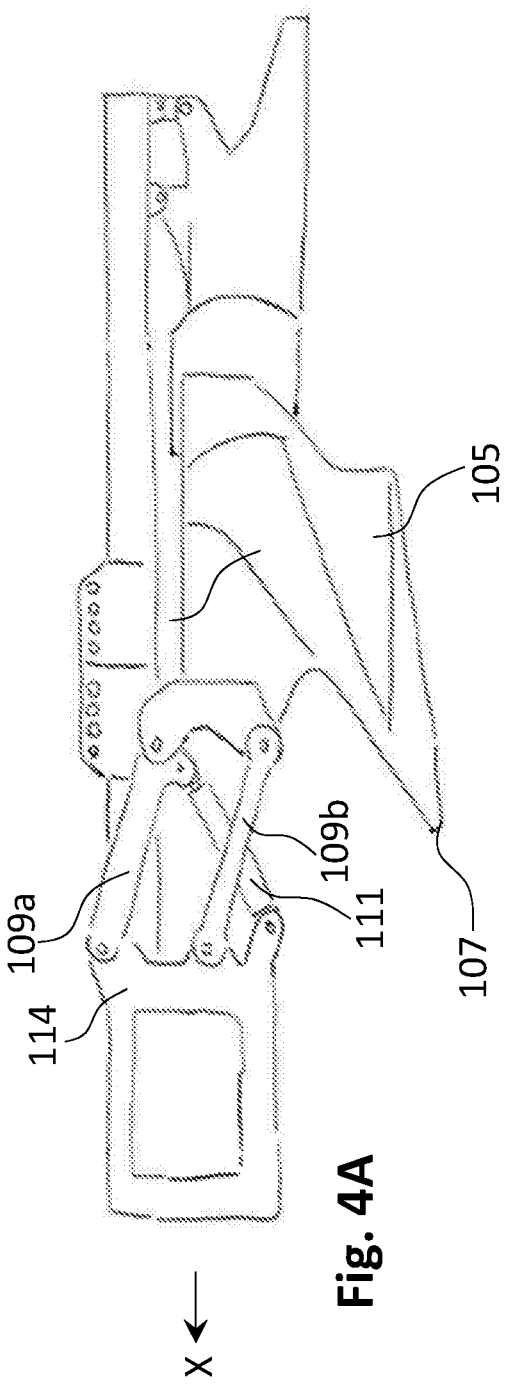
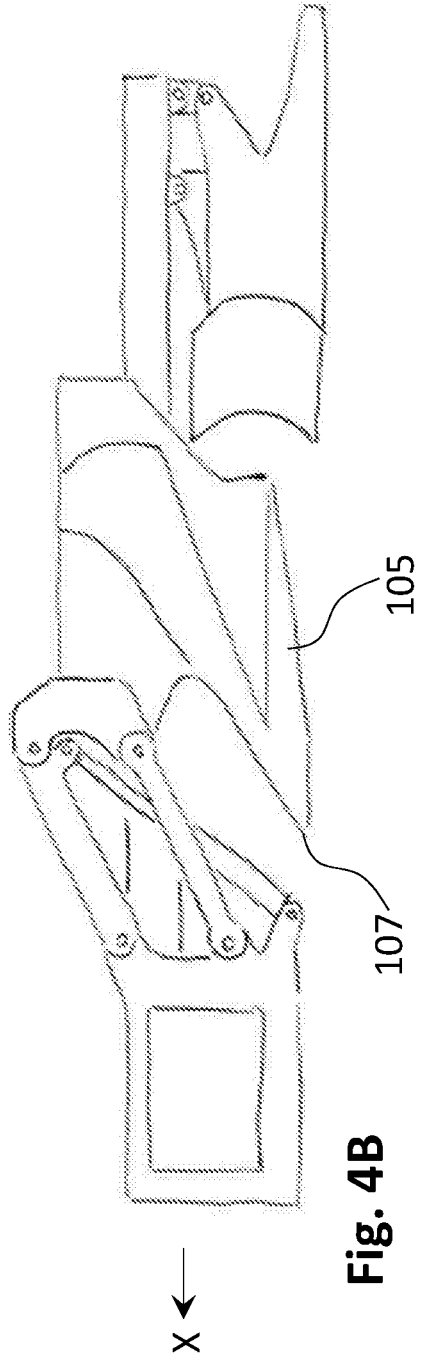

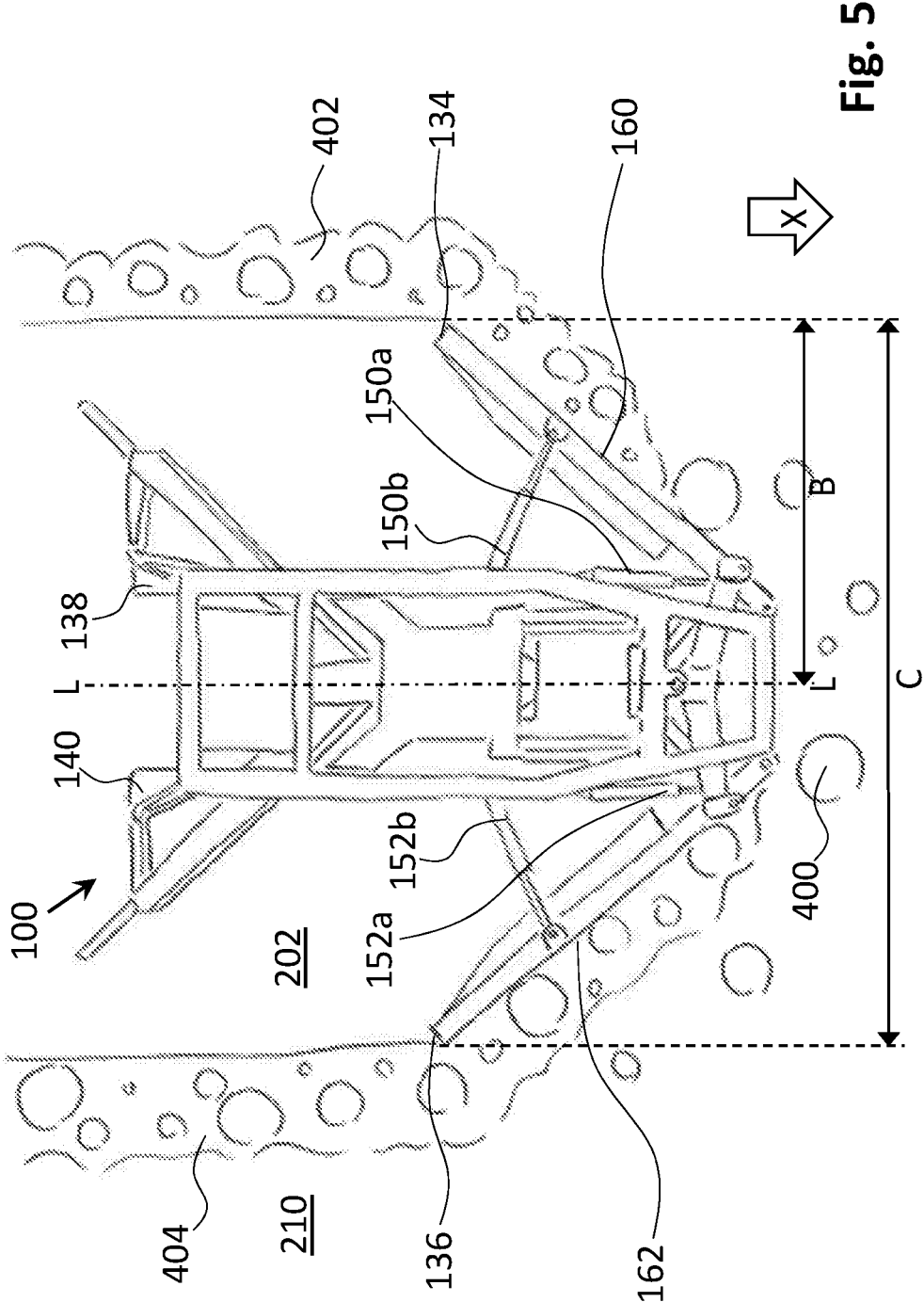

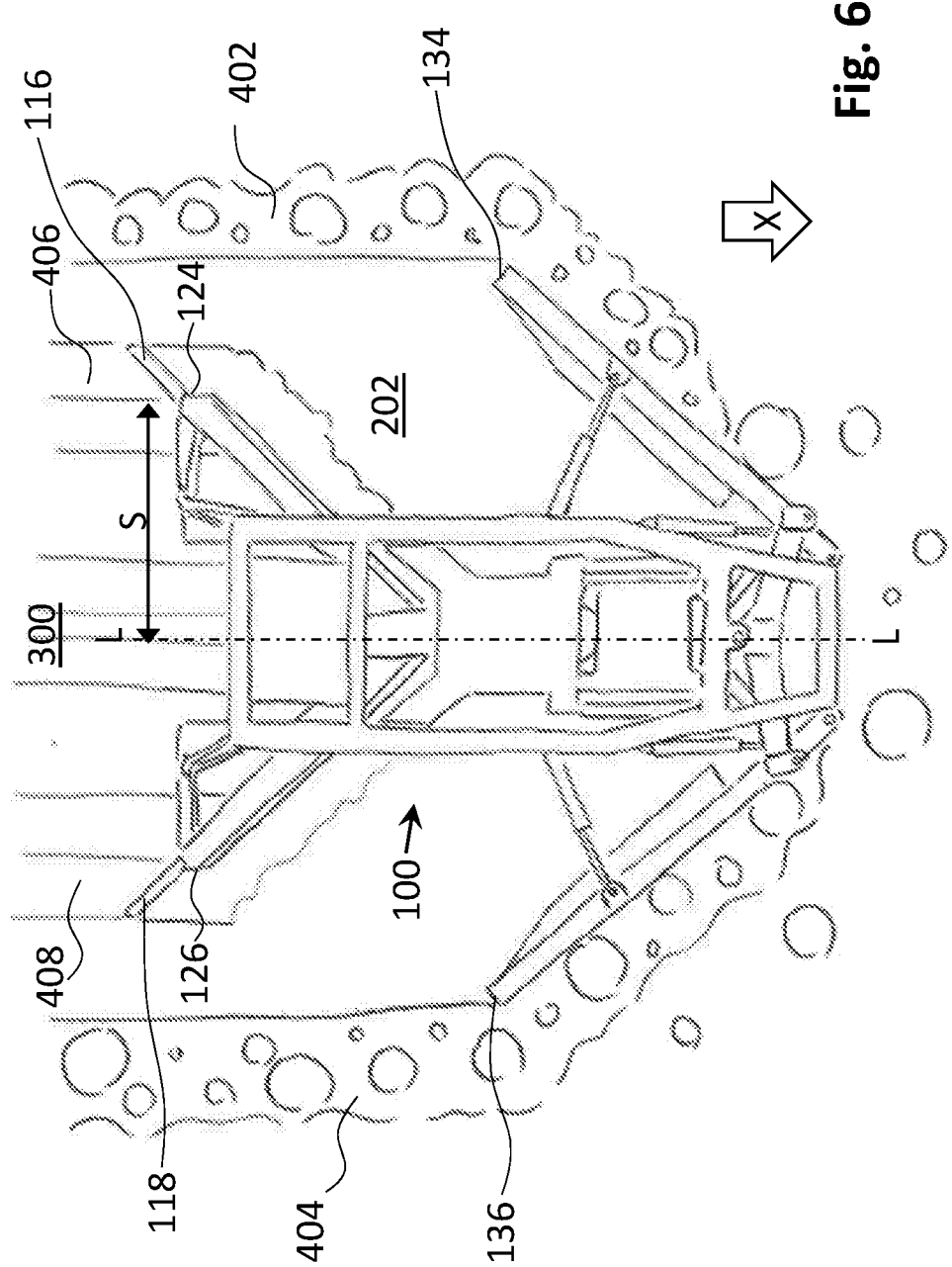

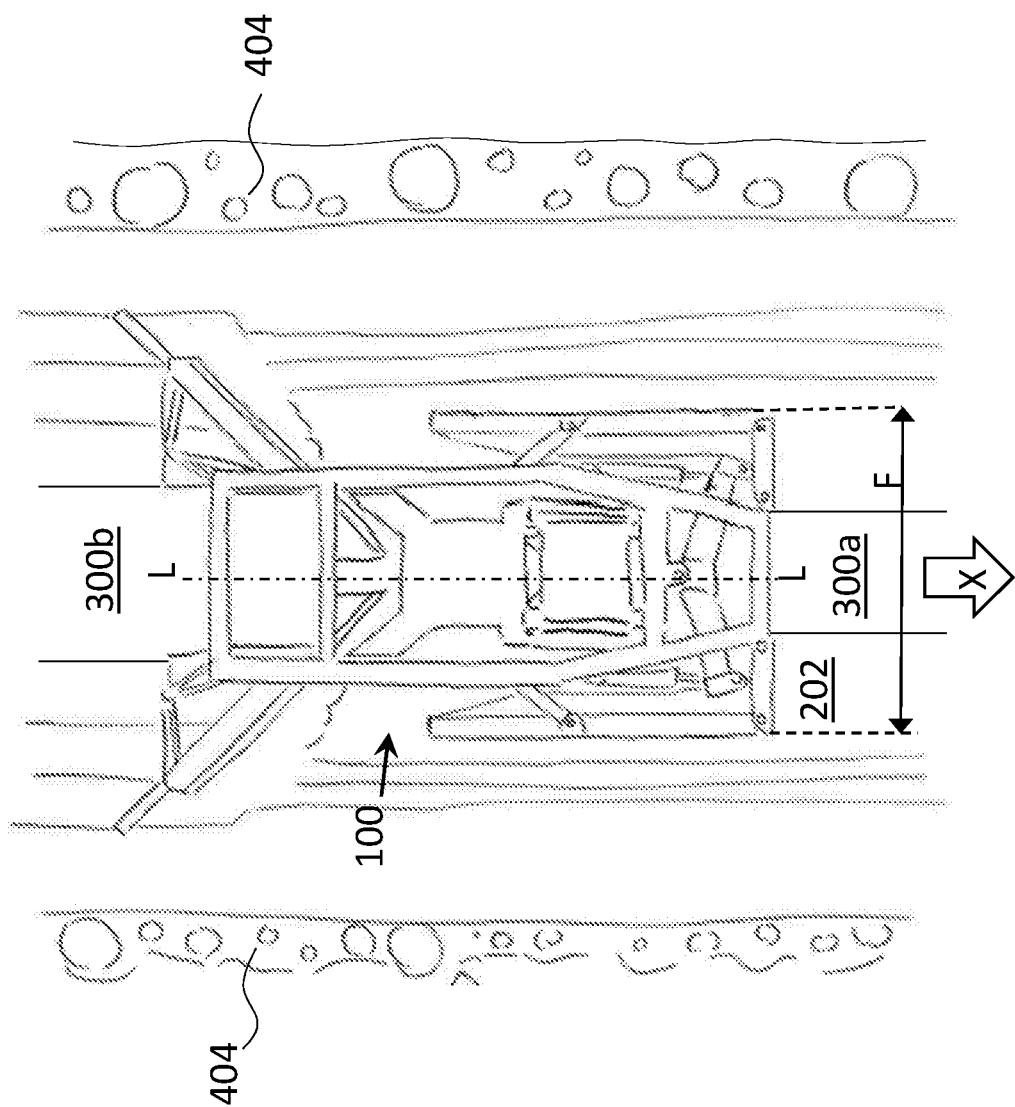

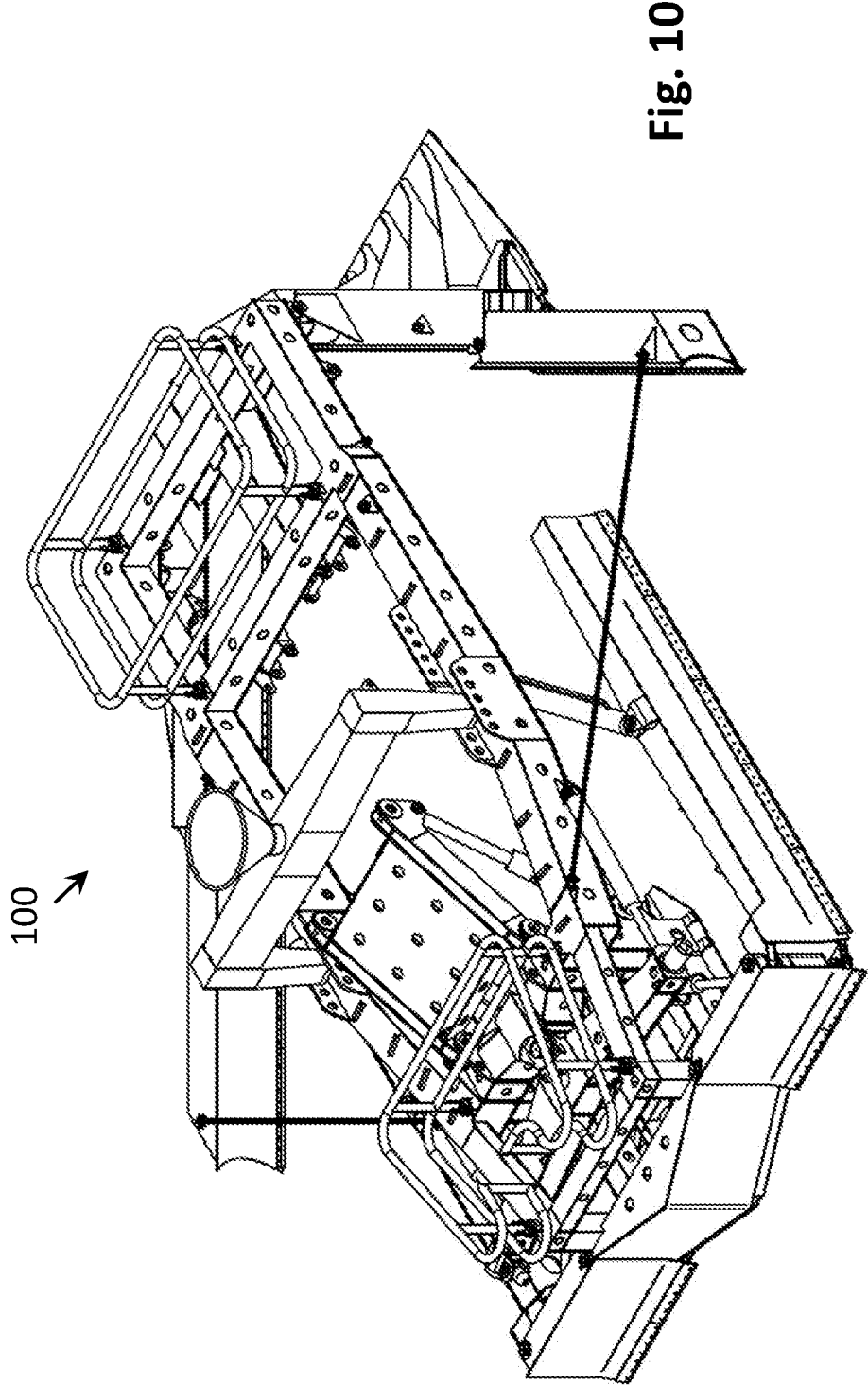

SUBSEA PLOUGH FOR BURYING A FLEXIBLE ELONGATE MEMBER

This application is the U.S. national phase of International Application No. PCT/GB2019/053572 filed Dec. 17, 2019 which designated the U.S. and claims priority to Great Britain Patent Application No. 1900580.0 filed Jan. 16, 2019, the entire contents of each of which are hereby incorporated by reference.

The present invention relates to a subsea plough and a method of using a subsea plough. In particular but not exclusively, the present invention relates to a subsea plough usable to form a channel for a flexible elongate structure at a subsea location, and to bury flexible elongate structure in the channel.

It is well known that various types of flexible elongate structures must, from time to time, be supplied across a subsea seabed surface. An example of such a flexible elongate member is a power cable. Conventionally, to help protect a power cable, for example from trawling nets and anchors, such cables have been buried at a predetermined depth below the seabed surface.

Latterly, environmental concerns about heating the seabed have driven power cables to be buried to a depth that relates to the thermal conductivity of the soil and not just for protection. It is very difficult to measure protection, therefore the acceptance criteria is often burial depth.

Subsea power cables are used for connecting between land-masses (interconnectors), for connecting offshore generators (export cables), and for connecting between offshore generators (inter-array cables). These offshore generators are most commonly wind turbines, which are set in arrays to minimise infrastructure costs. The distance between wind turbine generators is typically between a 0.5 and 1 kilometre.

There are a range of different technologies for burying subsea cables, which have been developed to suit different soil types and environments. A subsea plough can be used for long cable runs, such as for interconnectors and export cables, however the typical separation distance of wind turbines prevents a subsea plough being towed between the turbines for burying inter-array power cables. Prior art techniques for burying inter-array cables include self-propelled tractors, which bury cables by water jetting in non-cohesive sands, by chain cutting in clay and using a rock wheel in weak rock.

A common seabed soil type on the Northern European continental shelf is known a boulder clay, which is strong alluvial clay, compacted under a glacier, containing many large stones and boulders; formed by deposition from melting glaciers and ice sheets. The boulders have been carried down in the glacier and are deposited where the glacier melted. This causes the boulders to be concentrated in areas on or close to the surface of the seabed.

Surface boulders impede the progress of seabed tractors, and boulders buried in clay cause damage to chain cutters, and are too hard to cut with a rock wheel. A subsea plough is very effective in boulder clay.

A known technique to remove surface boulders is to clear the cable route with a surface clearance plough before the wind turbines are installed. This improves mobility of the seabed tractor, but does not assist with the protection of the cable.

Subsea ploughs generally control their ploughing depth using the long-beam principle. Height adjustable skids at the front of the plough control the distance of the plough chassis from the seabed. The plough includes a long-beam plough share, with a tip at the front and a heel at the back. When the plough chassis is pitched forwards, the plough increases its cutting depth, and when the chassis is pitched up, the heel bears on the cut soil, lifting the tip and reducing the cutting depth. The long beam principle achieves a flat trench bottom, which is important for reducing as-laid stress in rigid pipes, but has the disadvantage that when changing the angle of the chassis relative to the seabed and when operating at shallow depths, the towing point is above the seabed, which reduces the stability of the plough.

EP3216925A1 describes a plough that can clear surface boulders along the path of the cable and form a stable trench prior to the installation of wind turbines. The plough chassis tips relative to the seabed to adjust the share depth. Spoil heaps left at either side of the stable trench are used to back-fill the trench after a cable has been laid at the bottom of the trench. The plough does a first pass to clear boulders, a second pass to create the full depth stable trench, and a third to back-fill the trench after a cable has been laid. The plough has to be recovered from the seabed, re-configured and replaced on the seabed, twice during a complete cycle, i.e. once after the first pass, to reconfigure for stable trench excavation, and again after the second pass to reconfigure for backfilling. Recovery and reconfiguring of the plough is time consuming and costly. A further disadvantage of this apparatus is that whilst backfilling the trench, the skids at the front of the plough are re-configured such that part of the skids run inside the stable trench, which provides a poor depth reference for the skids unless they are correctly aligned with the centre of the trench. If the skids are not correctly aligned with the centre of the trench, the skids could be caused to ride up one side of the trench, thereby misaligning the plough. Furthermore, there is a risk of damage to the cable caused by the sections of the skids which run inside the trench.

The present invention described below seeks to at least mitigate the limitations of the prior art. Accordingly the present invention provides, in a first aspect, a plough for forming a trench in a seabed, the plough comprising a chassis and having a longitudinal axis; wherein in a first configuration, the plough comprises: a share coupled to the chassis; a boulder clearance member provided towards a first, leading end of the plough; a spoil clearance member provided towards a second, trailing end of the plough; a front support surface and a rear support surface; and wherein in the first configuration, a maximum span of the boulder clearing member in an extended position is greater than a span of the spoil clearance member.

The share may be coupled to the chassis by a share depth controlling means, wherein the share depth controlling means is configured to vary a vertical position of the share in relation to the chassis.

In the first configuration, the front support surface and rear support surface may be in a fixed vertical relationship with the chassis. Furthermore, the boulder clearance member and spoil clearance member may be in a fixed vertical relationship with the chassis.

The plough may be reconfigurable between the first configuration and a second configuration; wherein in the second configuration, the plough comprises a backfilling member.

The backfilling member may be in a fixed vertical relationship with the chassis, and a maximum span of the backfill member may be less than the span of the boulder clearance member and greater than a span of the spoil clearance member.

In the first configuration, the share and the spoil clearance member may be removably attached to the chassis.

The share depth controlling means may comprise a link assembly comprising a plurality of links and an actuator.

The boulder clearance member may comprise a first boulder clearance blade and a second boulder clearance blade. The first boulder clearing member may comprise a first section and second section which are pivotable with respect to each other, and the second boulder clearance blade may comprise a first section and a second section which are pivotable with respect to one another.

In the first configuration, the first boulder clearance blade, in the extended position, may be configured to form a first continuous boulder clearing surface, and the second boulder clearance blade may be configured to form a second continuous boulder clearing surface. A maximum width of a profile of the boulder clearance blades, in horizontal plane and perpendicular to the longitudinal centreline of the plough, may be less than a distance between a distal end of the first spoil clearance blade and a distal end of the second spoil clearance blade.

The spoil clearance member may comprise a first spoil clearance blade and a second spoil clearance blade, and boulder separating tines may be provided on a distal end of each of the first and second spoil clearance blades.

In a further aspect, the present invention provides a method of using a plough in accordance with claim 1, the method comprising steps of:
- (i) locating the plough, in the first configuration, on the seabed;
- (ii) moving the plough in a forwards direction along a plough path;
- (iii) clearing, by the boulder clearing member, boulders from the plough path, and urging the boulders to a first distance away from the longitudinal centreline of the plough.

The method may comprise further steps of;
- (iv) excavating, by the plough share, spoil from the seabed thereby to form a trench in the seabed;
- (v) clearing, by the spoil clearance member, the spoil from the plough path, and urging the spoil to second distance away from the longitudinal centreline of the plough, wherein the second distance is less than the first distance.

In one operational mode, steps (ii) to (v) are undertaken simultaneously.

The formed trench may be a stable trench having a truncated V shaped profile adjacent a surface of the seabed, and a vertical sided slot remote from the surface of the seabed.

The formed trench may have a first depth; and the method may further comprise a subsequent steps of;
- (vi) reconfiguring the boulder clearing member to a folded position in which a maximum width of a profile of the boulder clearance member, in horizontal plane and perpendicular to the longitudinal centreline of the plough, is less than the span of the spoil clearance member;
- (vii) increasing, by the share depth controlling means, a vertical separation of the share in relation to the chassis; and
- (viii) moving the plough over the formed trench;
- (ix) excavating, by the plough share, further spoil from the seabed thereby to increase the depth of the trench;
- (x) clearing, by the spoil clearance member, the further spoil from the plough path, and urging the further spoil to the second distance away from the longitudinal centreline of the plough.

The method may comprise subsequent steps of reconfiguring the plough to a second configuration, and moving the plough back over the excavated trench, thereby returning, by the backfilling member, the spoil to the trench.

In the second configuration, the rear support surface may comprise a backfill member support surface provided underneath the backfill member, wherein, when the plough is located on the seabed in the second configuration, the rear support surface and the boulder clearance member support surfaces bear the weight of the plough on the seabed.

Reconfiguring the plough to the second configuration may comprise removing the share, the front support surface, and the spoil clearing member; fitting the backfill member; and reconfiguring the boulder clearance member to a folded in configuration in which a maximum width of a profile of the boulder clearance member, in horizontal plane and perpendicular to the longitudinal centreline of the plough, is less than a span of the spoil clearance member.

In the second configuration, the rear support surface may comprise a support surface provided underneath the backfill member; wherein, when the plough is located on the seabed, the rear support surface, and a boulder clearance member support surface on an underside of the boulder clearance member, bear a weight of plough on the seabed.

In the first configuration, the rear support surface may comprise a spoil clearance member support surface provided underneath the spoil clearance member; wherein, when the plough is located on the seabed in the first configuration, the front support surface, the rear support surface, and a boulder clearance member support surface provided on an underside of the boulder clearance member, bear a weight of the plough on the seabed.

The present invention will now be described by way of example only and with reference to the accompanying figures, in which:

FIGS. 4A and 4B are side views of the subsea plough of FIG. 1 with certain components removed for clarity;

FIG. 5 is a top view of a subsea plough of FIG. 2 in the first configuration in a boulder clearing only mode on a seabed;

FIG. 6 is a top view of the subsea plough of FIG. 2 in the simultaneous boulder clearing and trenching mode on a seabed;

FIG. 7 is a top view of the subsea plough of FIG. 2 in a second pass trenching mode on a seabed;

FIGS. 9 and 10 are further views corresponding to FIGS. 2 and 3;

Figure 1:
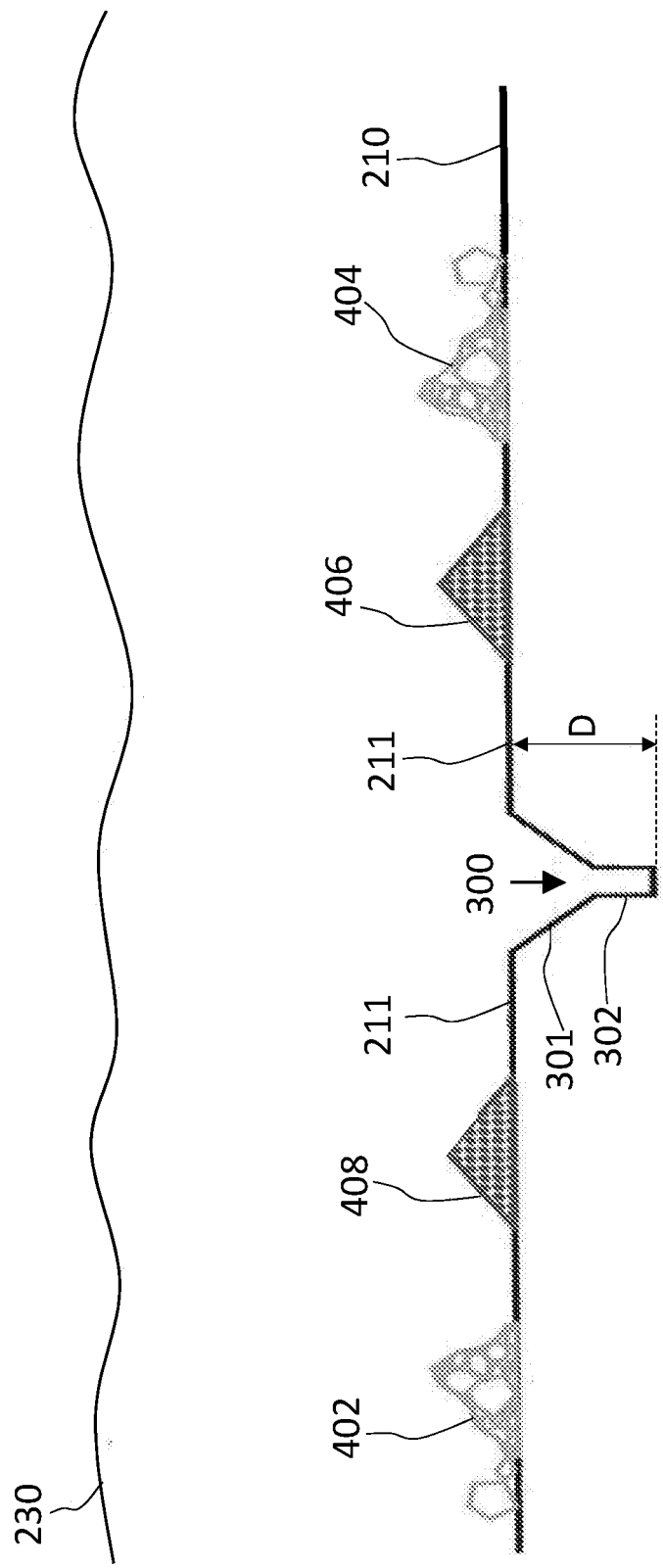
FIG. 1 is a cross-sectional, schematic representation of a subsea location, and a trench profile as created by a subsea plough in accordance with the present invention.

Embodiments of the present invention comprise a subsea plough 100. Referring to FIG. 1, The plough 100 can be used at a subsea location, i.e. on a seabed 210 below a sea surface 230. The plough is used firstly in a preparation stage, to excavate a channel or trench 300 in the seabed 210. After a flexible elongate member has been laid in the excavated channel 300, the plough 100 is used again in a backfilling stage, to backfill spoil into the trench 300, thereby to bury the flexible elongate member in the seabed 210. It is to be understood that the flexible elongate member which is laid into a trench 300 formed by the plough 100 of the present invention could comprise, for example, a power cable, communication cable, umbilical or flexible pipe or the like.

Figure 2:
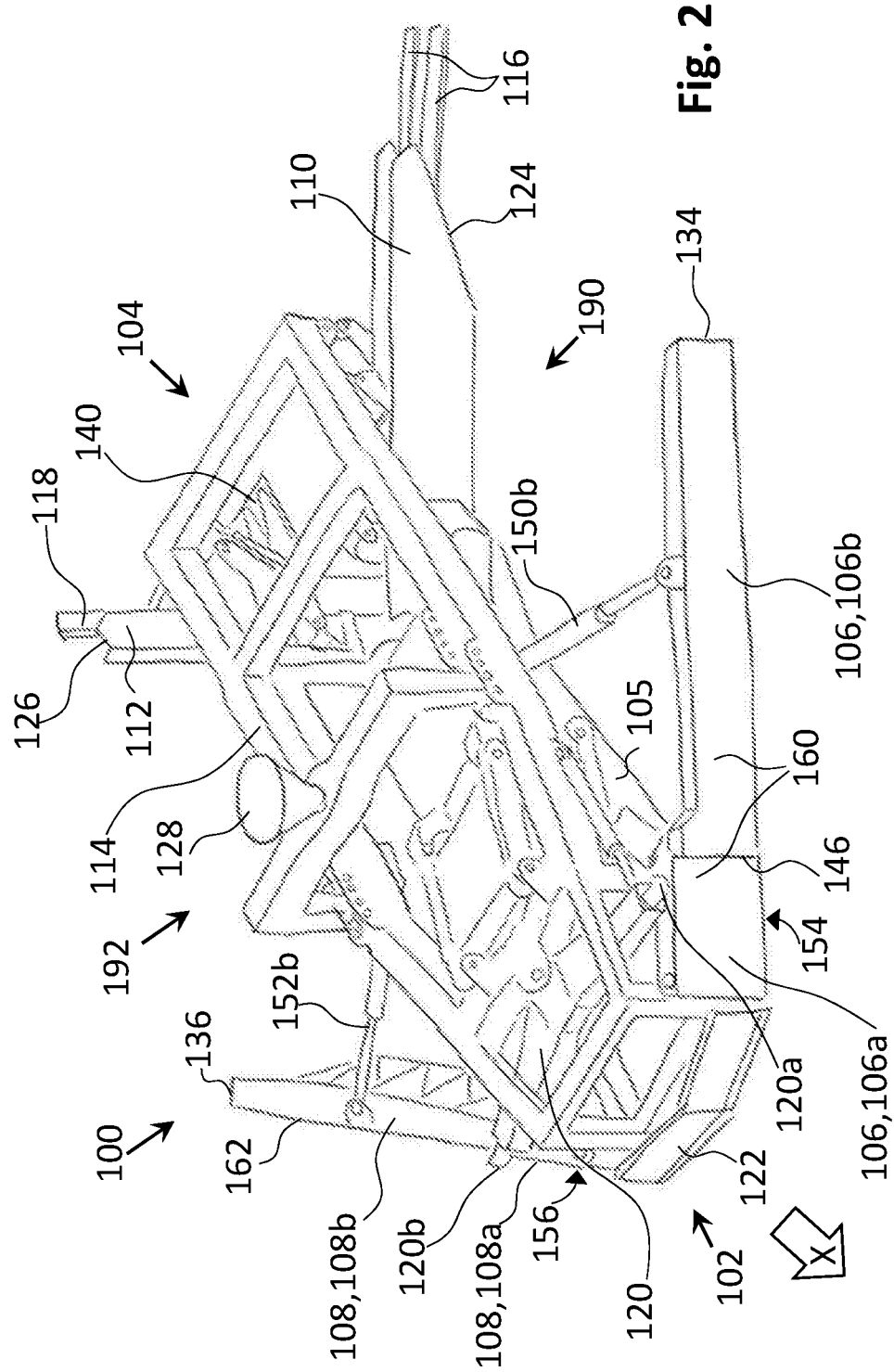
FIG. 2 is an isometric view of a subsea plough in accordance with the present invention in a first configuration.
Figure 3:
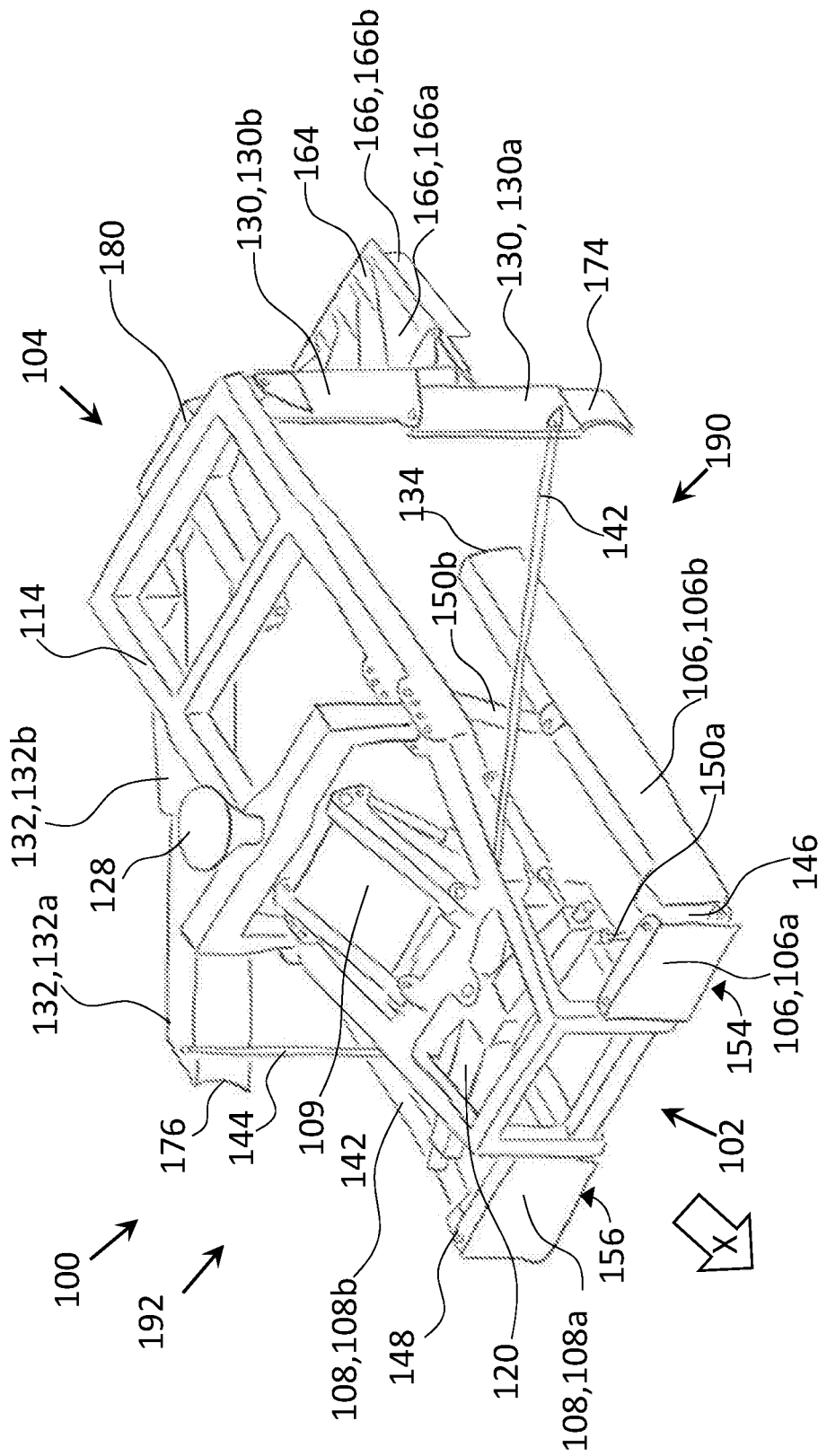
FIG. 3 is an isometric view of a subsea plough in accordance with the present invention in a second configuration.

Referring to FIGS. 2 and 3, the plough 100 comprises a first, front/leading end 102, and a second, rear/trailing end 104 remote from the first end 102, a port side 190 and a starboard side 192 opposite the port side 190. A main framework of the plough comprises a chassis 114. A lift point 128 is connected to the chassis 114, to be used in launching and recovering of the plough 100. A towing bridle (not shown), is connected to the chassis 114 via ends 120a, 120b of a steering linkage 120.

A first configuration of the plough, as shown in FIG. 2, will now be described. In the illustrated embodiment, a front support surface is provided by a front skid 122, which is removably attached to the chassis 114 toward the front end 102 of the plough 100. A boulder clearing member, comprising a first, port side boulder clearance blade 106 and a second, starboard side boulder clearance blade 108, are provided towards the front end 102 of the plough 100. A spoil clearance member, comprising a first, port side spoil clearance blade 110 and a second, starboard side spoil clearance blade 112, are provided towards the rear end 104 of the plough 100.

A plough share 105 is provided between the first and second ends 102, 104 of the plough 100. The share 105 is removably coupled to the chassis 114 by a link assembly 109 comprising an arrangement of links 109a, 109b, and a link assembly hydraulic actuator 111 (FIGS. 4A and 4B). The link assembly 109 acts as a share depth controlling means, which allows the vertical position, i.e. depth of the share 105, relative to the chassis 114, to be adjusted, without substantially changing the pitch of the share 105. By control of the link assembly 109 via the link assembly hydraulic actuator 111, a cutting tip 107 (FIGS. 4A and 4B) of the share 105 is urged towards and into the seabed 210 when excavation of the seabed 210 is required, and is urged towards and away from the seabed 210 when excavation is not required.

Support surfaces 138, 140 (only 140 is visible on FIG. 2, both are indicated on FIG. 5), provided underneath and behind (in relation to a direction of plough travel X) each of the first spoil clearance blade 110 and the second spoil clearance blade 112 respectively, together act as a rear support surface/rear skid.

FIG. 4A illustrates the share 105 in a trenching mode, wherein the cutting tip 107 is lower (i.e. separated in a vertical direction) than the front and rear support surfaces, such that when the plough 100 is located with the front and rear support surfaces in contact with the seabed 210, the cutting tip 107 will penetrate the seabed 210, and as the plough 100 is moved forwards in the direction of travel X, spoil will be excavated from the seabed 210 to form a channel 300. FIG. 4A illustrates the share 105 having a first depth, however the depth can be varied under the control of the linkage mechanism 109.

FIG. 4B illustrates the share 105 in a non-trenching mode, wherein the cutting tip 107 is level with the front and rear support surfaces, such that when the plough 100 is located with the front and rear support surfaces in contact with the seabed 210, the cutting tip 107 will not penetrate the seabed 210.

The depth of the cutting tip 107 of the share 105, i.e. the vertical separation D of the cutting tip 107 from the front and rear support surfaces, determines the depth to which the plough will penetrate into the seabed 210 and therefore the depth of the channel 300 which will be formed by the plough 100. The depth of the cutting tip 107 is controlled by the link assembly 109, i.e. the link assembly 109, via the link assembly hydraulic actuator 111, controls the vertical separation D of the cutting tip 107 from the support surfaces, thereby to provide a depth D of excavated channel 300 (FIG. 1).

The width of the excavated channel 300 is also varied by varying the depth of the share 105. As the cutting tip 107 is caused to penetrate to a greater depth D into the seabed 210, more of the share 105 also enters the channel 300, thereby forming a channel 300 having a wider V-form section (further described below).

The front skid 122, rear skid, boulder clearance blades 106, 108, and spoil clearance blades 110, 112 are all located vertically (in relation to the seabed 210), at a fixed distance from the chassis 114, i.e. the skids, boulder clearance blades 106, 108 and spoil clearance blades 110, 112 are in a fixed vertical relationship with the chassis 114 when the plough 100 is in the configuration shown in FIG. 2.

The first boulder clearance blade 106 comprises a first section 106a which is attached to the chassis 114, and a second section 106b which is attached to the first section 106a via a hinge 146. The first section 106a is connected to the chassis 114 via a hydraulic actuator 150a (indicated on FIGS. 3 and 5) and the second section 106b is connected to the chassis 114 via a further hydraulic actuator 150b. In the configuration of FIG. 2, the first section 106a and the second section 106b are aligned such that outward facing (with respect to a direction of travel X of the plough 100) surfaces of the first and second sections 106a, 106b provide a continuous boulder clearing surface 160.

Similarly, the second boulder clearance blade 108 comprises a first section 108a which is attached to the chassis 114, and a second section 108b, which is attached the first section 108a via a hinge 148 (indicated in FIG. 3). The first section 108a is connected to the chassis 114 via a hydraulic actuator 152a (indicated on FIG. 5), and the second section 108b is connected to the chassis 114 via a further hydraulic actuator 152b (indicated in FIG. 5). In the configuration of FIG. 2, the first section 108a and the second section 108b are aligned such that outward facing surfaces of the first and second sections 108a, 108b provide a continuous boulder clearing surface 162.

The first boulder clearance blade 106 extends outwardly and rearwardly (with respect to the direction of travel X) to the port side 190, to a distal end 134, and the second boulder clearance blade 108 extends outwardly and rearwardly to the starboard side 192, to a distal end 136. An underside 154, 156 respectively of each of the boulder clearance blades 106, 108 has a support surface.

The first spoil clearance blade 110 is removably attached to the chassis 114 and extends outwardly and rearwardly (with respect to the direction of travel X) from the plough 100 on the port side 190, to a distal end 124. Boulder separating tines 116 are provided at the distal end 124 of the first spoil clearance blade 110. Similarly, the second spoil clearance blade 112 is removably attached to the chassis 114 and extends outwardly and rearwardly from the plough 100 on the starboard side, to a distal end 126, with boulder separating tines 118 being provided at the distal end 126.

The configuration of the plough 100 as shown in FIG. 3 will now be described. In this configuration, the spoil clearance blades 110, 112 and front skid 122 have been removed from the plough 100, and the share 105 has been removed from the plough 100 at the link assembly 109. Towards the rear 104 of the plough, a backfilling member comprising a first, port side backfill blade 130, a second, starboard side backfill blade 132, and a connecting section 180, has been fitted.

The first backfill blades 130 comprises a first, outer section 130a, which is pinned to a second, inner section 130b. Similarly, the second backfill blade 132 comprises a first, outer section 132a which is pinned to a second, inner section 132b. The inner sections 130b, 132b of the backfill blades are connected by the connecting section 180, A support surface 164, provided underneath and behind (in relation to the direction of travel X) the second sections 130b, 132b and the connecting section 180 of the backfill blades 130, 132, acts as a rear skid.

The first backfill blade 130 is removably attached to the chassis 114 and extends outwardly and forwardly (in relation to the direction of travel X) to the port side 190, to a distal end 174. Similarly, the second backfill blade 132 is removably attached to the chassis 114 and extends outwardly and forwardly to the starboard side 192, to a distal end 176.

Operation

Figure 8:
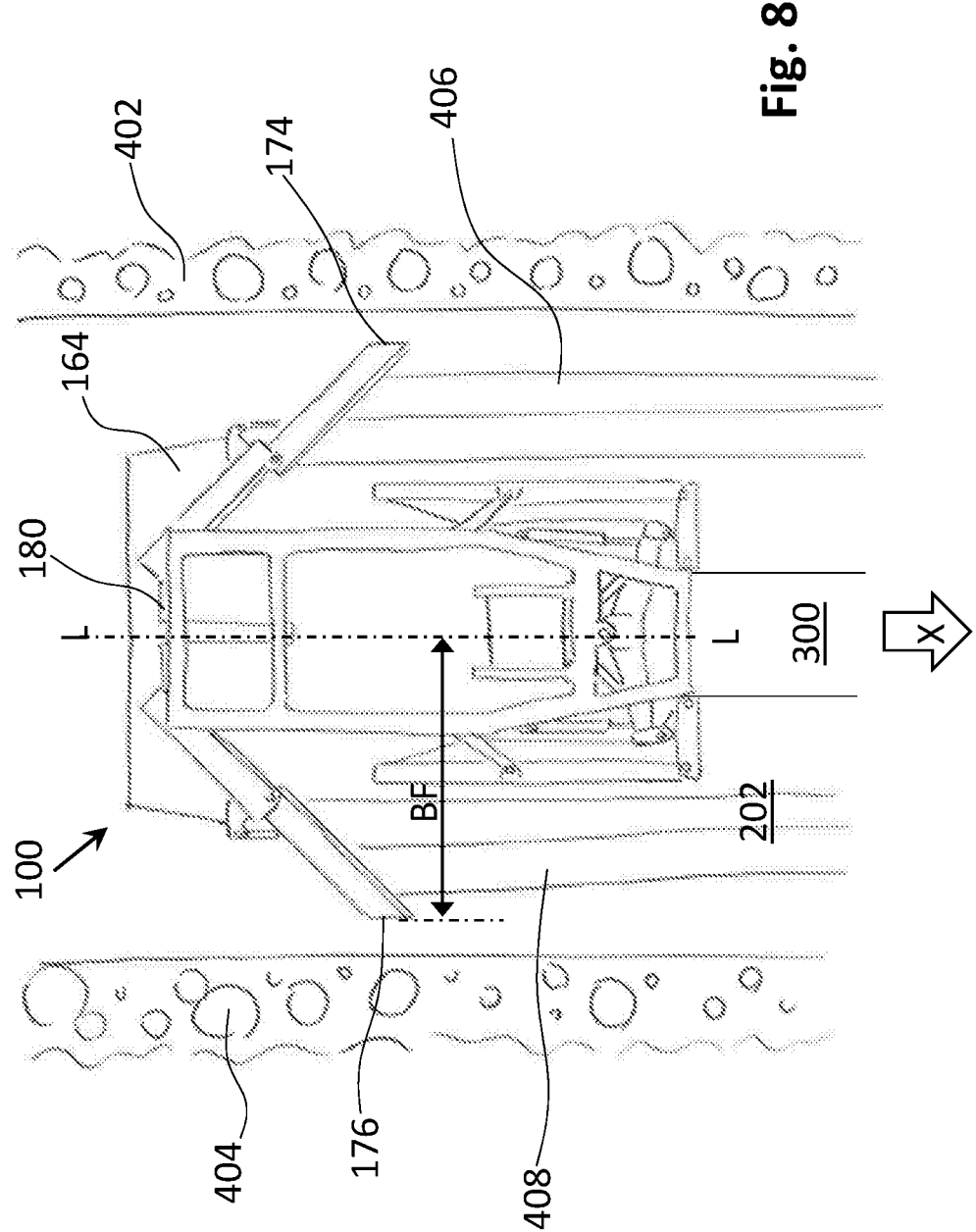
FIG. 8 is a top view of the subsea plough of FIG. 3 in a backfilling mode on a seabed.

As described in greater detail below, the subsea plough 100 can be used in various modes. FIGS. 5 to 7 illustrate the plough 100 in situ on a seabed 210, and show respectively preparation stages comprising a boulder clearing only mode, a simultaneous boulder clearing and trenching mode, a second pass trenching mode. FIG. 8 illustrates a subsequent backfilling stage.

Boulder Clearing Only

In the boulder clearing only mode of use as illustrated in FIG. 5, boulders are cleared from a path 202 of the plough 100 along a seabed 210.

The front support surface provided by the front skid 122, rear skid (provided by the support surfaces 138, 140 underneath and behind the spoil clearance blades 110, 112), and the support surfaces on the undersides 154, 156 of the boulder clearance blades 106, 108, bear the weight of plough 100 on the seabed 210, and maintain the chassis 114 at a set height above the seabed 210 as the plough 100 is moved.

The boulder clearance blades 106, 108 are in the configuration shown in FIG. 2, i.e. fully extended/folded out, to form a clearance width, or maximum span, C. The share 105 is maintained in a lifted or raised position as shown in FIG. 4B, such that the cutting tip 107 of the share 105 does not penetrate the seabed 210.

The plough 100 is towed via the towing bridle attached to the steering linkage 120, in the forwards direction X. Boulders 400 on the surface of the seabed 210 in the path 202 of the plough 100 contact the boulder clearing surfaces 160, 162 of the boulder clearance blades 106, 108 and are urged outwardly to form elongate boulder heaps or piles 402, 404 at the distal ends 134, 136 of the boulder clearance blades 106, 108, i.e. the boulder heaps 402, 404 are formed. A minimum separation of the boulder heaps 402, 404, in a distance from, and perpendicular to, the longitudinal centreline L-L of the plough 100, is indicated as B in FIG. 5.

As the share 105 is in the raised position, the cutting tip 107 does not penetrate the seabed 210, and no excavation of the seabed 210 occurs.

As described above, boulder clearance of the seabed 210 is possible with the share 105 fully raised such that it is not in contact with the seabed 210, therefore providing no disturbance to the seabed 210. The mass of the plough 100 generates a significant amount of ground friction to resist sideways movement. However, in situations of considerable uneven loading of the boulder clearance blades 106, 108, a steering ability of the plough 100 can be improved by lowering the share 105 until it engages with the seabed 210. The contact between the share 105 and the seabed 210 provides both side support, to resist lateral motion of the plough 100 relative to the seabed 210, and a pivot point about which to steer the plough 100. To minimise disturbance to the seabed 210, the share 105 can be engaged for a limited time to allow the steering to change the direction of the path of the plough 100, then disengaged, i.e. returned to the raised position of FIG. 4B.

Simultaneous Boulder Clearing and Trenching

In the simultaneous boulder clearing and trenching mode is shown in FIG. 6, as the plough 100 is towed in the forwards direction X, boulders 400 are cleared from the path 202 of the plough 100, and simultaneously, behind the boulder-cleared path 202 (in the direction of travel X), a channel 300 is excavated in the seabed 210. The boulder clearance blades 106, 108 have therefore cleared boulders from the path 202 of the plough ahead of the excavation of the channel 300.

The front support surface provided by the front skid 122, the rear skid (provided by the support surfaces 138, 140 underneath and behind the spoil clearance blades 110, 112), and the support surfaces on the undersides 154, 156 of the boulder clearance blades 106, 108, bear the weight of plough 100 on the seabed 210, and maintain the chassis 114 at a set height above the seabed 210 as the plough is 100 moved across the seabed 210.

The boulder clearance blades 106, 108 are in the same configuration as for the boulder-clearing only mode of FIG. 5, fully extended/folded out, and having a span C. Boulders are cleared from the path 202 of the plough 100 in the same manner as described above in respect of FIG. 5, to form boulder heaps 402, 404, at a minimum distance B away from and perpendicular to the longitudinal centreline L-L of the plough 100.

However, in contrast to the mode of FIG. 5, the share 105 is in a lowered configuration as shown in FIG. 4A, such that the cutting tip 107 of the share penetrates the seabed 210, and a channel 300 is therefore ploughed in the seabed 210 by excavation of spoil from the seabed 210. The spoil which is removed from the seabed 210 by the share 105 is urged outwardly by the spoil clearance blades 110, 112, to form elongate spoil heaps or piles 406, 408 at the distal ends 124, 126 of the blades.

As described above, boulders 400 on the surface of the seabed 210 are cleared from the path 202 of the plough 100 by the boulder clearance blades 106, 108. However, further boulders may be buried beneath the surface of the seabed 210, and such boulders may be dug up by the share 105 of the plough 100. The boulder separating tines 116, 118 provided at the distal ends 124, 126 of the spoil clearance blades 110, 112 act to separate large boulders that are dug up by the share 105 and push them to the outside of the spoil heaps 406, 408, so that they do not get returned to the channel 300 on subsequent backfilling to avoid the such boulders causing damage to a cable laid in the channel 300.

The channel 300 formed by the share 105 is a stable trench, i.e. having a truncated V-shaped cross-sectional profile 301 adjacent to the surface of the seabed 210, decreasing in width away from the surface, and having a vertical sided slot 302 at the bottom of the truncated V-shape, remote from the surface of the seabed 210 as illustrated in FIG. 1.

The horizontal width between the distal ends 124, 126 of the spoil clearance blades 110, 112, i.e. the span of the spoil clearance blades 110, 112, is less than the clearance width or span C of the fully extended boulder clearance blades 106, 108. The span of the spoil clearance blades 110, 112 does not include the boulder separating tines 116, 118.

A minimum separation of the spoil heaps 406, 408, in a distance from, and perpendicular to, the longitudinal centreline L-L of the plough 100, is indicated as S in FIG. 6. Distance S is less than distance B, i.e. the spoil heaps 406, 408 are formed closer to the longitudinal centreline L-L of the plough 100, and therefore closer to the excavated channel 300, than the boulder heaps 402, 404.

The distance between the distal ends 124, 126 of the spoil clearance blades 110, 112, and the clearance width C of the fully extended boulder clearance blades 106, 108, is selected such that in addition to the spoil heaps 406, 408 being closer to the longitudinal centreline L-L of the plough 100 than the boulder heaps 402, 404, they are also clearly separated from the boulder heaps 402, 404, i.e. there is a clearance between the spoil heaps 406, 408 and the boulder heaps 402, 404.

Furthermore, the horizontal width between the distal ends 124, 126 of the spoil clearance blades 110, 112 is selected such that the spoil heaps 406, 408 are separated from the channel 300 by a flattened area 211 of seabed 210, adjacent to either side of the channel 300, i.e. an area which is clear of boulders and spoil.

Second Pass Trenching

A further mode of operation of the plough 100, as illustrated in FIG. 7, is second pass trenching. It may be necessary to excavate a trench to a first depth and width on a first pass, and to a second, greater depth and width on a second pass. For example, areas of seabed 210 with greater resistance to the cutting tip 107 of the share 105 may require a two-stage cutting process to achieve a full-depth channel.

In a first pass, the plough 100 operates as described above in respect of FIG. 6, to simultaneously clear boulders, and with the share 105 lowered to a first depth, so as to form a trench 300a of a first depth and width. The plough 100 is then reconfigured before the second pass; the reconfiguring of the plough can be performed on the seabed.

Reconfiguring the plough 100 for the second pass further comprises lowering the plough share 105, by the link assembly 109, to a greater depth than on the first pass.

As boulders have been cleared from the path 202 on the first path, the boulder clearing member is not required on the second pass. Therefore reconfiguring the plough 100 before the second pass also comprises folding in the boulder clearance blades 106, 108, by the hydraulic actuators 150a, 152a, pushing the first sections 106a, 108a of the boulder clearance blades forwards, and hydraulic actuators 150b, 152b pulling the second sections 106b, 108b of the boulder clearance blades 106, 108 inwardly towards the chassis 114, thereby causing the first sections 106a, 108a and the second sections 106b 108b to pivot with respect to each other at the hinges 146, 148.

The front support surface provided by the front skid 122, rear skid (provided by the support surfaces 138, 140 underneath and behind the spoil clearance blades 110, 112), and the support surfaces on the undersides 154, 156 of the boulder clearance blades 106, 108 bear the weight of plough 100 on the seabed 210, and maintain the chassis 114 at a set height above the seabed 210 as the plough is 100 moved.

In the folded-in/pulled-in configuration, the second sections of the boulder clearance blades 106b, 108b are parallel to the longitudinal centreline L-L of the plough. A maximum total width of the boulder clearance blades 106, 108 in the folded-in position, indicated as F in FIG. 7, is less than the separation between the distal ends 124, 126, i.e. the span, of the spoil clearance blades 110, 112. Therefore during the second pass, the support surfaces on the undersides 154, 156 of the boulder clearance blades 106, 108 run on the flattened areas 211 of seabed 210 adjacent either side of channel 300, and the boulder clearance blades 106, 108 do not impinge upon or disturb the spoil clearance heaps 406, 408 which were formed on the first pass.

Further spoil is excavated from the seabed 210 by the share 105 as it penetrates the seabed 210 to a greater depth than on the first pass. The further spoil is also urged, as described in respect of FIG. 6, to the distal ends 124, 126 of the spoil clearance blades 110, 112 and is added to the spoil heaps 406, 408 which were established during the first pass.

Backfill

After a full depth stable channel 300/300b has been formed by the plough 100, a flexible elongate structure such as a cable can be laid in the channel 300/300b. Whilst the cable is being laid, the plough 100 is recovered and returned to a vessel on the sea surface 230 or to shore, and is reconfigured for backfilling the channel 300/300b thereby to bury the cable in the channel 300/300b.

The backfilling operation is expected to be undertaken a significant time after the boulder clearing and trenching operations. The path 202 is assumed to still be clear of boulders, and the spoil heaps 406, 408 are assumed to still be in the proximity of the trench 300 such that backfilling is practicable.

Reconfiguring the plough 100 for backfill comprises removing the front skid 122 and the spoil clearance blades 110, 112, and removing the share 105 at the link assembly 109. The backfill blades 130, 132, are fitted towards the rear 104 of the plough, and the boulder clearance blades 106, 108 are reconfigured to the folded configuration shown in FIG. 3.

To reconfigure the boulder clearance blades 106, 108 to the folded configuration, the hydraulic actuators 150a, 152a are actuated to push the first sections 106a, 108a of the boulder clearance blades 106, 108 forwards (in the direction of travel X), and hydraulic actuators 150b, 152b are actuated to pull the second sections 106b, 108b of the boulder clearance blades 106, 108 inwardly towards the chassis 114, as described above in respect of the second pass trenching mode.

Similarly to the second pass trenching mode, the support surfaces on the undersides 154, 156 of the folded in boulder clearance blades 106, 108 run on the flattened, clear areas of seabed 211 adjacent to the either side of the channel 300/300b during the backfilling pass and therefore do not impinge upon or disturb the spoil clearance heaps 406, 408.

Actuators are provided to pivot the first section 130a, 132a and second sections 130b, 132b. Chains 142, 144 are provided between an upper surface of the first, outer sections 130*a*, 132*a* of the backfill blades 130, 132 and the chassis 114.

During the backfilling pass, the support surfaces on the undersides 154, 156 of the boulder clearance blades 106, 108, and the rear skid (provided by the support surface 164 provided under and behind the second sections 130*b*, 132*b* and the connecting section 180 of the backfill blades 130, 132) bear the weight of plough 100 on the seabed 210, and maintain the chassis 114 at a set height above the seabed 210 as the plough is 100 moved.

The backfill blades 130, 132 are fully extended by the actuators, i.e. into the configuration shown in FIG. 3. The plough 100 is towed back along the excavated channel 300/300*b*, which now has a cable laid in the vertical sided slot 302.

A separation of the distal ends 174, 176 of the backfill blades 130, 132 in a fully extended position, i.e. a maximum span of the backfill blades 130, 132, is greater than the separation of the spoil heaps 406, 408, but less than the separation of the boulder heaps 402, 404. A backfill reach, or span, BF, of each backfill blade 130, 132, i.e. a distance from and perpendicular to the longitudinal centreline L-L of the plough 100, as indicated in FIG. 8, is less greater than S (FIG. 6) but less than B (FIG. 5). Therefore as the plough 100 is towed back along the path 202, spoil from the spoil heaps 406, 408 is urged back into the channel 300 by the backfill blades 130, 132, and the boulder heaps 402, 404 are not disturbed. The chains 142, 144 bear the force provided by the spoil heaps 402, 404 against the backfill blades 130, 132 as the plough 100 moves forwards.

The support surface 164 provided underneath and behind the backfill blades 130, 132 comprises ribs 166 (shown in FIG. 3) which extend longitudinally (in relation to the longitudinal centreline L-L of the plough 100). The ribs 166 each comprise an upper section 166*a*, extending along a top of the support surface 164, and a corresponding lower section 166*b* (one of which is visible on FIG. 3) which extend from an underside of the support surface 164. When the plough 100 is placed on the seabed 210 in the backfilling configuration, the lower sections 166*b* of the ribs 166 penetrate the seabed 210 to provide lateral guidance to the plough 100, and to ensure that the steering linkage 120 and bridle are effective in steering the plough 100 along the channel 300/300*b*.

The subsea plough 100 of the present invention can be used with any suitable control system, such as a remote control and surveillance system. Any suitable power source could be used, such as an electro-hydraulic subsea power pack, and any suitable deployment and recovery system could be used, such as a detachable bullet and latch system.

Figure 9:
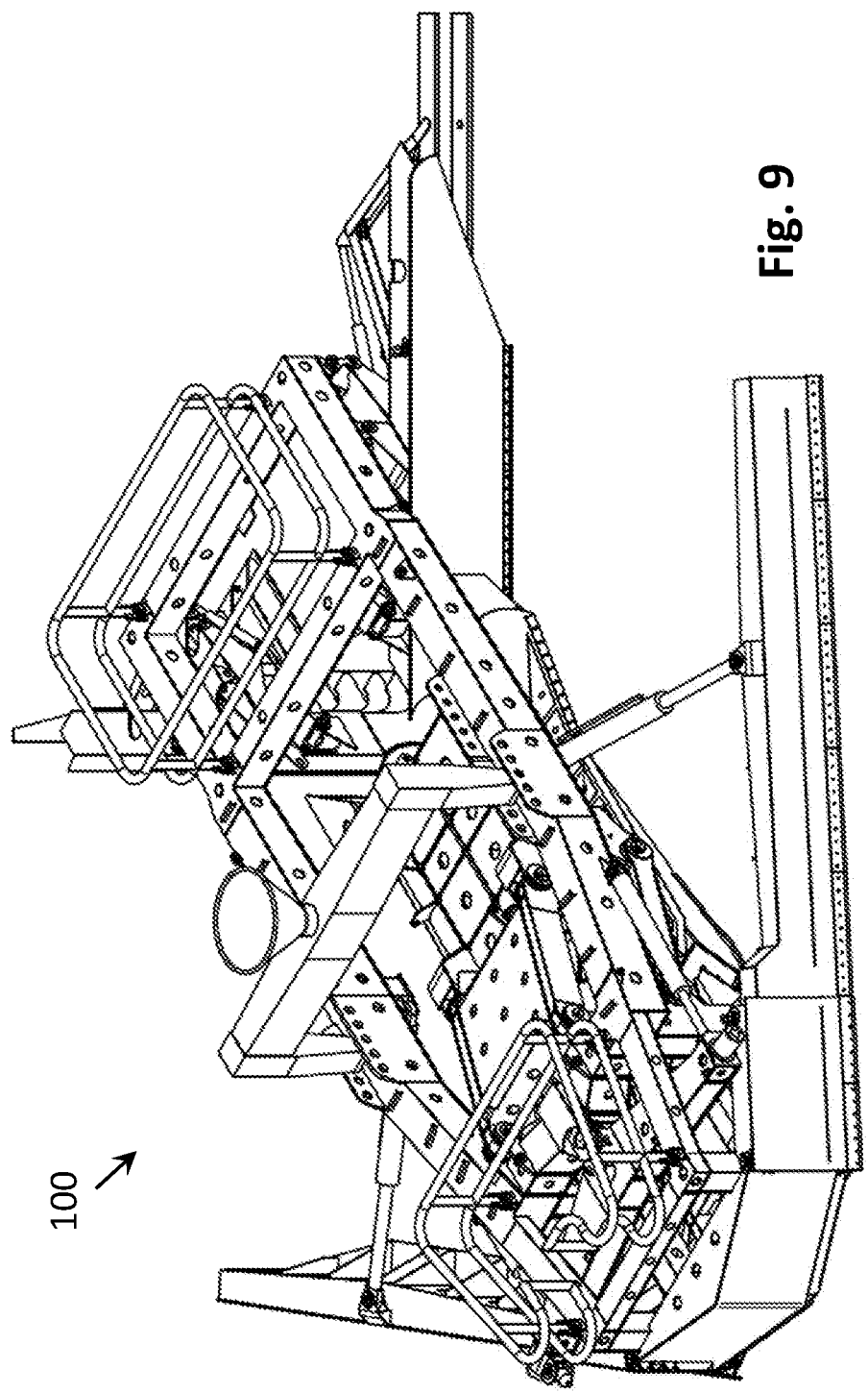
Figure 11A:
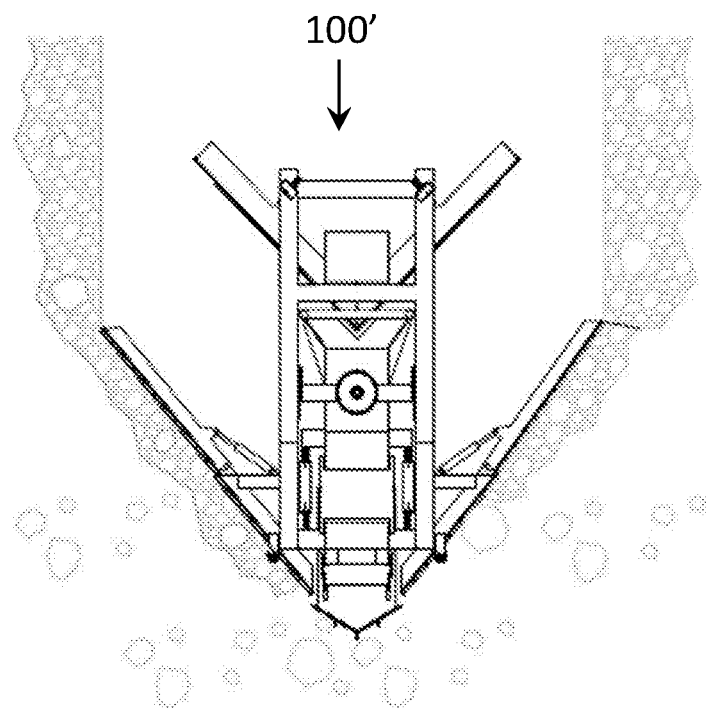
FIGS. 11A and 11B are further views of a subsea plough in accordance with the present invention corresponding to FIG. 5.
Figure 11B:
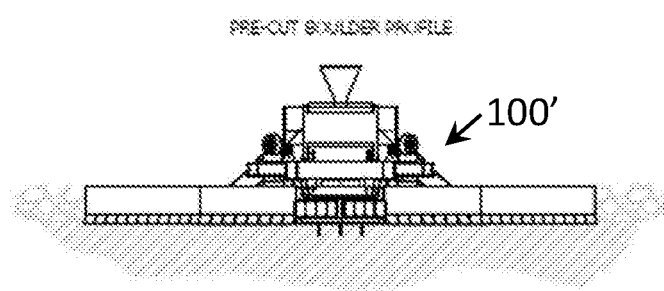
Figure 12A:
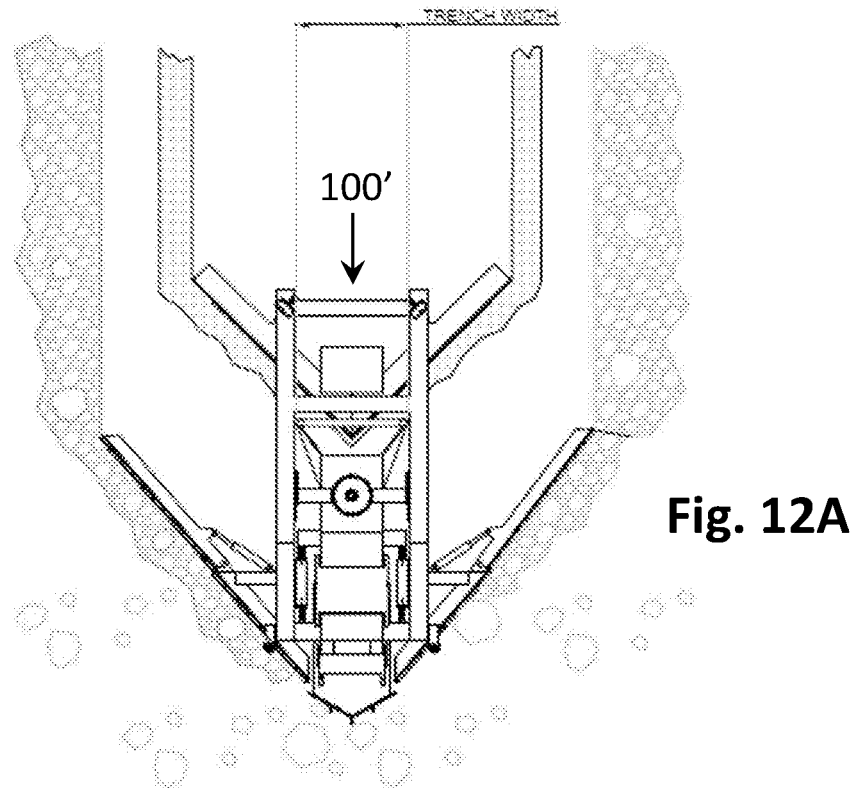
FIGS. 12A to 12C are further views of a subsea plough in accordance with the present invention corresponding to FIG. 6.
Figure 12B:
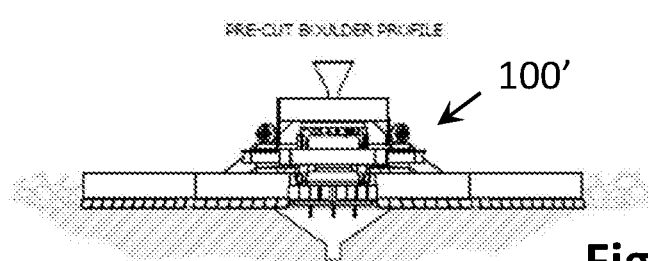
Figure 12C:
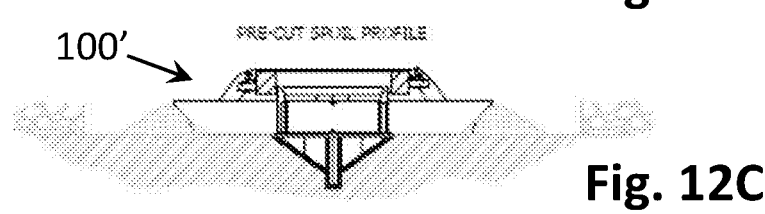
Figure 13A:
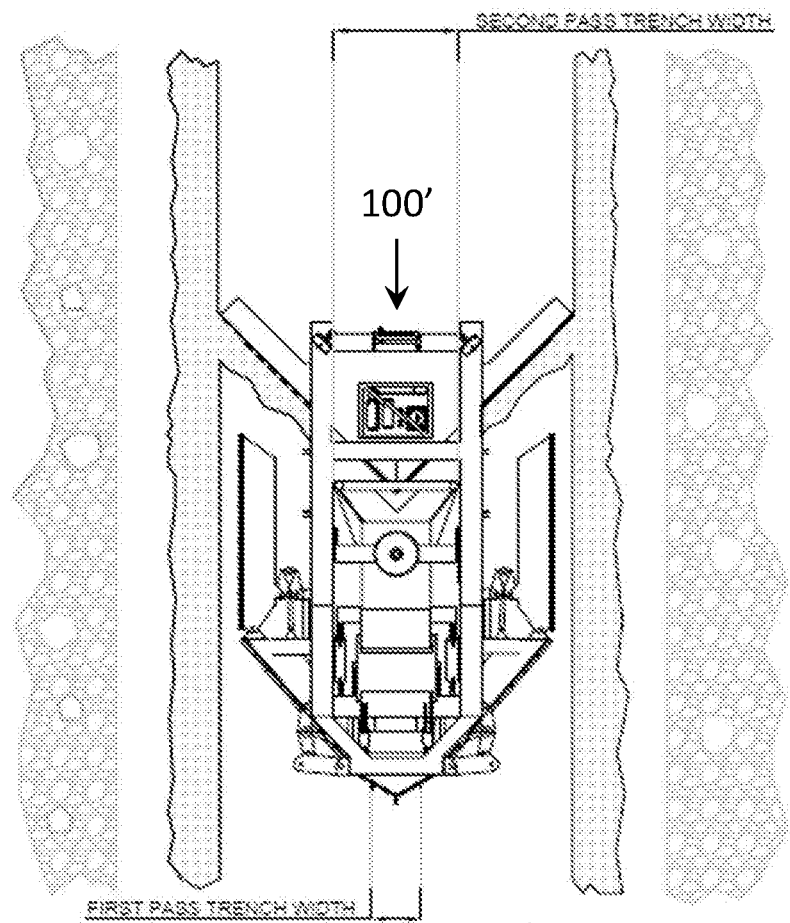
FIGS. 13A and 13B are further views of a subsea plough in accordance with the present invention corresponding to FIG. 7.
Figure 13B:
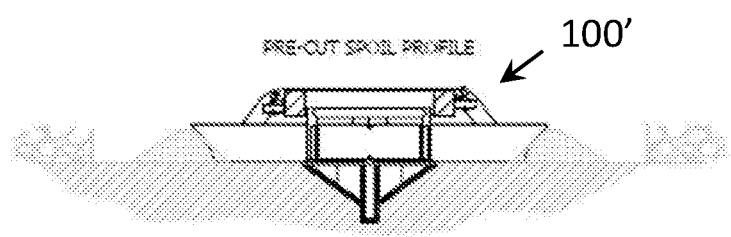
Figure 14B:
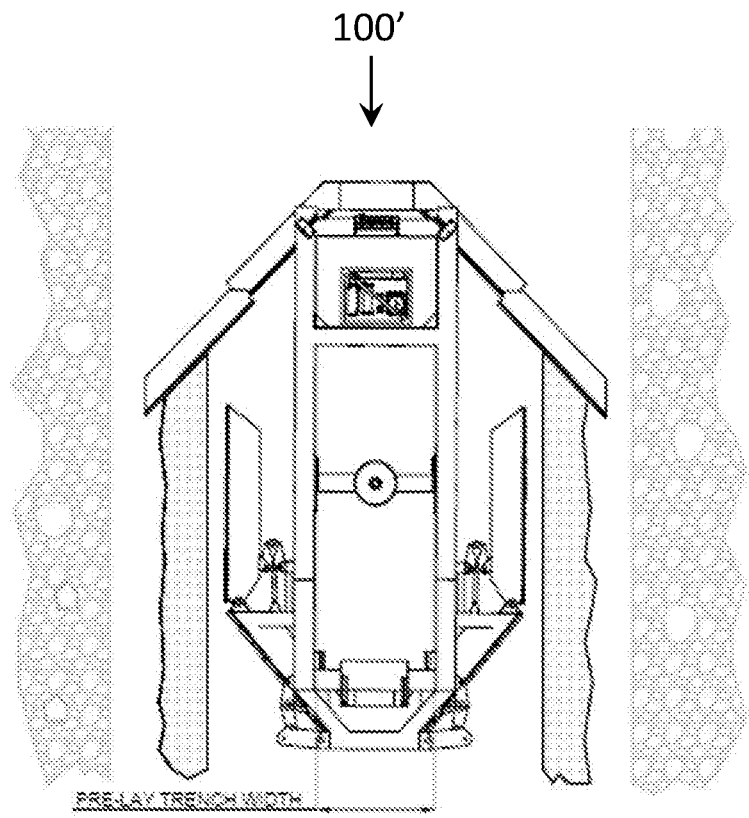
FIGS. 14A and 14B are further views of a subsea plough in accordance with the present invention corresponding to FIG. 8.
Figure 14A:
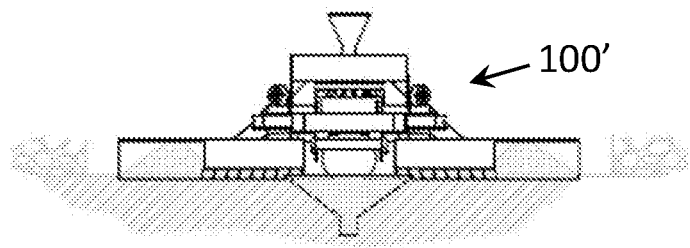

FIGS. 9 and 10 are alternative illustrations of the plough 100 as described above. FIGS. 11A to 14B illustrate operational modes of an alternative subsea ploughs 100' in accordance with the present invention. The alternative plough 100' is substantially similar to the plough 100 as described above, and the description of the operational modes of plough 100' is to be understood to apply to the alternative plough 100'.

The embodiments of the plough as described above each provide a single machine which can be reconfigured between a first, preparation configuration, in which a seabed is prepared for cable laying, and a second, backfilling configuration, in which a trench is filled in, thereby to bury a cable in the seabed. However, it is conceivable that separate ploughs could be used for the preparation and backfilling operations.

In the illustrated embodiment, the front support surface is provided by a front skid, and the rear support surface is termed as a "rear skid". However, the front and rear support surfaces could comprise any suitable surfaces for supporting the plough on a seabed.

The present invention provides a subsea plough having many advantages over the prior art.

A first advantage is a significant reduction in the time taken in the preparation stage for a stable subsea trench for receiving a cable, compared to prior art subsea ploughs.

The prior art long-beam subsea plough requires retrieval of the plough from the seabed during the preparation stage, between the first, boulder clearing only path, the second, stable trench forming pass.

In contrast, the present invention does not require retrieval from the seabed during the preparation stage. If the plough is used in the simultaneous boulder clearing and trenching mode, the preparation stage can be completed in a single pass of the trench. Preparing the stable trench in a single pass ensures more effective separation of the spoil and boulders because it is not a function of steering accuracy, and it reduces the time taken to prepare a trench for a cable.

If second pass trenching is required to form a full-depth stable trench, the necessary reconfiguration for the second pass can be completed on the seabed. Therefore the preparation stage, i.e. the first and second trenching passes of the plough, is still completed without requiring the costly and time consuming retrieval of the plough from the seabed for reconfiguring.

The timing of the operational modes of the plough of the present invention can be based around, for example, an installation schedule for wind turbines. When the plough is used to form channels for inter-array cables, the preparation stage, comprising the simultaneous boulder clearing and trenching mode, (and optionally reconfiguring on the seabed and a second pass trenching mode), can be undertaken, and the plough then returned to a vessel or to shore to be reconfigured for backfilling.

The reconfiguring of the plough for backfill can be undertaken whilst the wind turbines are being installed, therefore the time taken to reconfigure the plough is less critical than the time taken to prepare the channel.

A further advantage of the present invention is that, because the maximum span of the boulder clearing member, i.e. in its extended position, is greater than the span of the spoil clearance member, the plough ensures that boulder heaps are separated from spoil heaps, so that when backfilling the trench, a cable is protected only by spoil, and is not damaged by boulders being backfilled into the trench which risk crushing of the cable.

The present invention also enables a rapid transition between trenching and non-trenching modes, during a single run of the plough. This is also particularly beneficial for use around wind turbine arrays, wherein power cables are daisy-chained between wind turbines and transformer stations, and two cables usually approach each wind turbine 180° apart. When required, the link mounted share of the plough enables a rapid transition into boulder-clearing only mode, in which the plough can be moved straight though the foundation site for a wind turbine, without risk of the share disturbing the soil where a turbine foundation is to be placed. In prior art subsea ploughs, when the plough is out of trenching mode, the tow point is above the seabed, reducing the stability of the plough. In the present invention, due to the support surfaces maintaining a set height of the chassis above the seabed, the plough is stable even whilst being towed with the share in the raised position. The plough can be rapidly reconfigured into the trenching mode by lowering the share via the link assembly, on the other side of the foundation site.

In prior art subsea ploughs based on the long-beam principle, wherein the front of the chassis is lifted to transition out of a trenching mode, transition happens slowly and is less controllable than the present invention. The angling into and out of a trench is limited by the long-beam action of the share. In contrast, in the present invention, the link assembly has an immediate effect on the resultant depth of the share below the seabed. Therefore a steeper grading into and out of a channel is possible.

For both clearing boulders and for backfilling, an echelon blade is only effective if it is maintained level with the seabed. In contrast to prior art subsea ploughs, in which the chassis tips relative to the seabed to adjust the share depth, the chassis of the plough of the present invention has support surfaces at the front and the rear of the chassis which maintain its reference to the seabed. The boulder clearance, spoil clearance and backfill blades are fixed in height relative to the chassis, and so are held level with the seabed in a stable manner, independent of depth of the share.

Furthermore, in the present invention, the spoil clearance blades are configure to move excavated spoil to a distance away from the edges of the trench, leaving a clear area at each side of the trench on which the support surfaces of the backfill blades can run. The separation of the spoil heaps from the trench also helps to prevent spoil being washed back into the trench by currents before the cable is installed.

A further advantage over the prior art subsea plough in which parts of the skids enter the trench during backfilling, is that in the present invention, the skids are maintained clear of the trench during the backfill mode, i.e. the skids do not enter the trench, thereby avoiding the risk of damage to the cable.

The present invention is also advantageous in that the boulder separating tines act to push large boulders which have been dug up by the share outside of the spoil heaps, so that they are not collected by the backfill blade and returned to the trench.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A plough for forming a trench in a seabed, the plough comprising a chassis and having a longitudinal axis;
   wherein in a first configuration, the plough comprises:
   a share coupled to the chassis;
   a boulder clearance member, comprising a boulder clearing surface, provided towards a first, leading end of the plough, for clearing boulders from a plough path, extending between a port side and a starboard side of the plough, and urging the boulders from the plough path to a first distance away from a longitudinal centreline of the plough;
   a spoil clearance member provided towards a second, trailing end of the plough, for clearing spoil from the plough path, and urging the spoil from the plough path to a second distance away from the longitudinal centreline of the plough, wherein the second distance is less than the first distance;
   a front support surface and a rear support surface;
   and wherein in the first configuration, a maximum span of the boulder clearance member in a first position is greater than a span of the spoil clearance member,
   wherein in the first configuration, the boulder clearing surface extends from a first distal end of the boulder clearance member located the first distance away from the longitudinal centreline of the plough, on the port side, to a second distal end of the boulder clearance member located the first distance away from the longitudinal centreline of the plough, on the starboard side.

2. A plough as claimed in claim 1 wherein in the first configuration, the front support surface and rear support surface are in a fixed vertical relationship with the chassis.

3. A plough as claimed in claim 1 wherein in the first configuration, the boulder clearance member and spoil clearance member are in a fixed vertical relationship with the chassis.

4. A plough as claimed in claim 1 which is reconfigurable between the first configuration and a second configuration; wherein in the second configuration, the plough comprises a backfilling member and optionally, wherein the backfilling member is in a fixed vertical relationship with the chassis, and wherein a maximum span of the backfill member is less than the span of the boulder clearance member and greater than a span of the spoil clearance member.

5. A plough as claimed in claim 1, wherein in the first configuration, the share and the spoil clearance member are removably attached to the chassis.

6. A plough as claimed in claim 1 wherein;
   the boulder clearance member comprises a first boulder clearance blade and a second boulder clearance blade; and wherein the first boulder clearing member comprises a first section and second section which are pivotable with respect to each other, and the second boulder clearance blade comprises a first section and a second section which are pivotable with respect to one another.

7. A plough as claimed in claim 6 wherein;
   in the first configuration, the first boulder clearance blade, in the first position, is configured to form a first continuous boulder clearing surface, and the second boulder clearance blade is configured to form a second continuous boulder clearing surface; and wherein when the boulder clearing member is in a second position, a maximum width of a profile of the boulder clearance blades, in horizontal plane and perpendicular to a longitudinal centreline of the plough, is less than a distance between a distal end of a first spoil clearance blade and a distal end of a second spoil clearance blade.

8. A plough as claimed in claim 1 wherein the spoil clearance member comprises a first spoil clearance blade and a second spoil clearance blade, and wherein boulder separating tines are provided on a distal end of each of the first and second spoil clearance blades.

9. A method of using a plough in accordance with claim 1, the method comprising steps of:
(i) locating the plough, in the first configuration, on the seabed;
(ii) moving the plough in a forwards direction along a plough path;
(iii) clearing, by the boulder clearing member, boulders from the plough path, and urging the boulders to a first distance away from a longitudinal centreline of the plough.

10. A method as claimed in claim 9, comprising further steps of;
(iv) excavating, by the plough share, spoil from the seabed thereby to form a trench in the seabed;
(v) clearing, by the spoil clearance member, the spoil from the plough path, and urging the spoil to second distance away from the longitudinal centreline of the plough, wherein the second distance is less than the first distance.

11. A method as claimed in claim 10 wherein steps (ii) to (v) are undertaken simultaneously.

12. A method as claimed in claim 10, wherein the formed trench is a trench having a truncated V shaped profile adjacent a surface of the seabed, and a vertical sided slot remote from the surface of the seabed.

13. A method as claimed in claim 10, wherein the formed trench has a first depth; and wherein the method further comprises a subsequent steps of;
(vi) reconfiguring the boulder clearing member to a second position in which a maximum width of a profile of the boulder clearance member, in horizontal plane and perpendicular to the longitudinal centreline of the plough, is less than the span of the spoil clearance member;
(vii) increasing a vertical separation of the share in relation to the chassis; and
(viii) moving the plough over the formed trench;
(ix) excavating, by the plough share, further spoil from the seabed thereby to increase the depth of the trench;
(x) clearing, by the spoil clearance member, the further spoil from the plough path, and urging the further spoil to the second distance away from the longitudinal centreline of the plough.

14. A method as claimed in claim 10, comprising subsequent steps of reconfiguring the plough to a second configuration, and moving the plough back over the excavated trench, thereby returning, by a backfilling member, the spoil to the trench.

15. A method as claimed in claim 14, and wherein, in the second configuration, the rear support surface comprises a backfill member support surface provided underneath the backfill member, and wherein, when the plough is located on the seabed in the second configuration, the rear support surface and support surfaces of the boulder clearance member bear the weight of the plough on the seabed.

16. A method as claimed in claim 14, wherein reconfiguring the plough to the second configuration comprises removing the share, the front support surface, and the spoil clearing member; fitting the backfilling member; and reconfiguring the boulder clearance member to a second configuration in which a maximum width of a profile of the boulder clearance member, in horizontal plane and perpendicular to the longitudinal centreline of the plough, is less than a span of the spoil clearance member.

17. A method as claimed in claim 14, wherein in the second configuration, the rear support surface comprises a support surface provided underneath the backfilling member;
and wherein, when the plough is located on the seabed, the rear support surface, and a boulder clearance member support surface on an underside of the boulder clearance member, bear a weight of plough on the seabed.

18. A method as claimed in claim 9, wherein;
in the first configuration, the rear support surface comprises a spoil clearance member support surface provided underneath the spoil clearance member;
and wherein, when the plough is located on the seabed in the first configuration, the front support surface, the rear support surface, and a boulder clearance member support surface provided on an underside of the boulder clearance member, bear a weight of the plough on the seabed.

19. A plough for forming a trench in a seabed, the plough comprising a chassis and having a longitudinal axis;
wherein in a first configuration, the plough comprises:
a share coupled to the chassis;
a boulder clearance member provided towards a first, leading end of the plough;
a spoil clearance member provided towards a second, trailing end of the plough;
a front support surface and a rear support surface;
and wherein in the first configuration, a maximum span of the boulder clearing member in a first position is greater than a span of the spoil clearance member,
wherein the share is coupled to the chassis by a share depth controlling means, wherein the share depth controlling means is configured to vary a vertical position of the share in relation to the chassis.

20. A plough as claimed in claim 19 wherein the share depth controlling means comprises a link assembly comprising a plurality of links and an actuator.

* * * * *